UNITED STATES PATENT OFFICE.

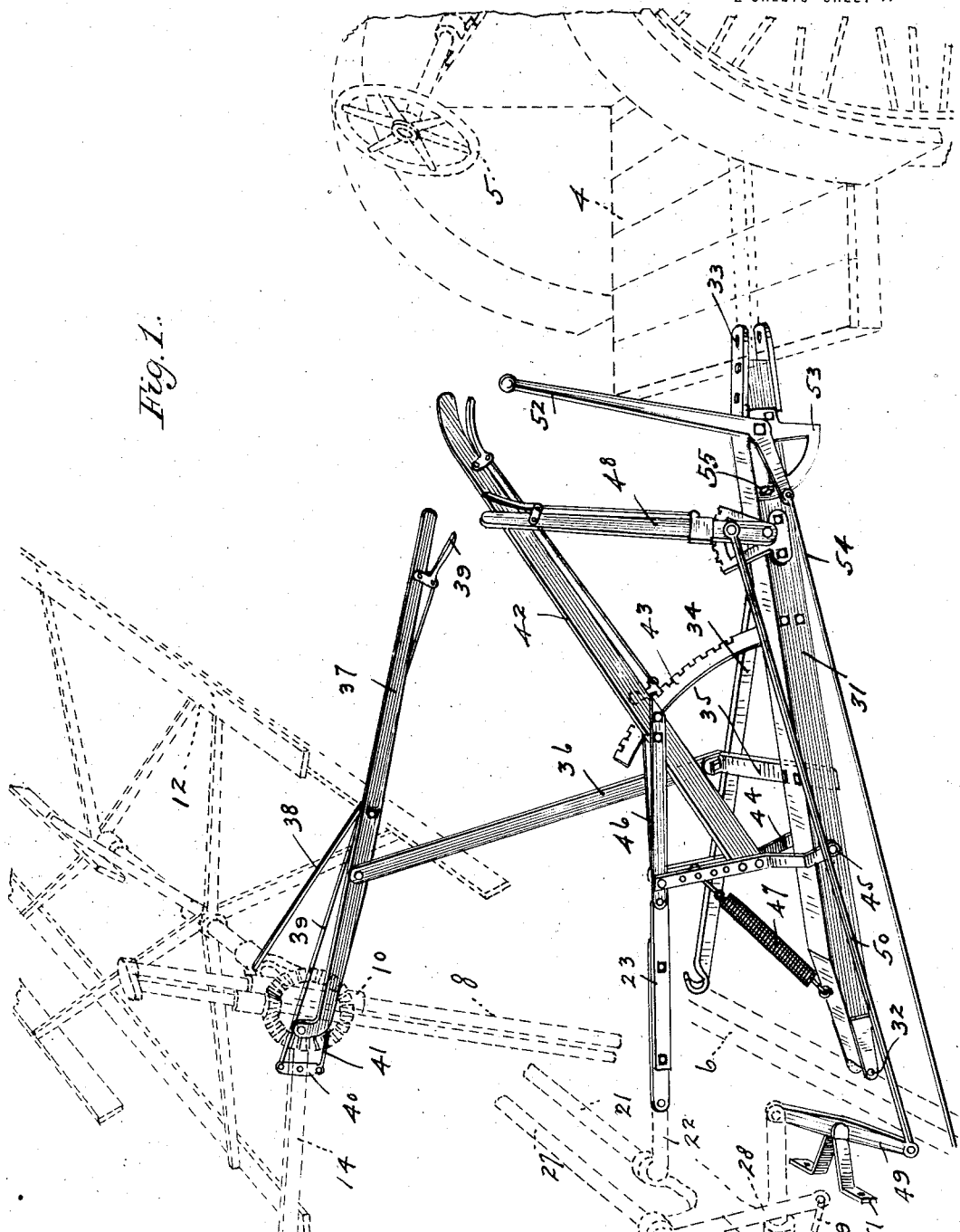

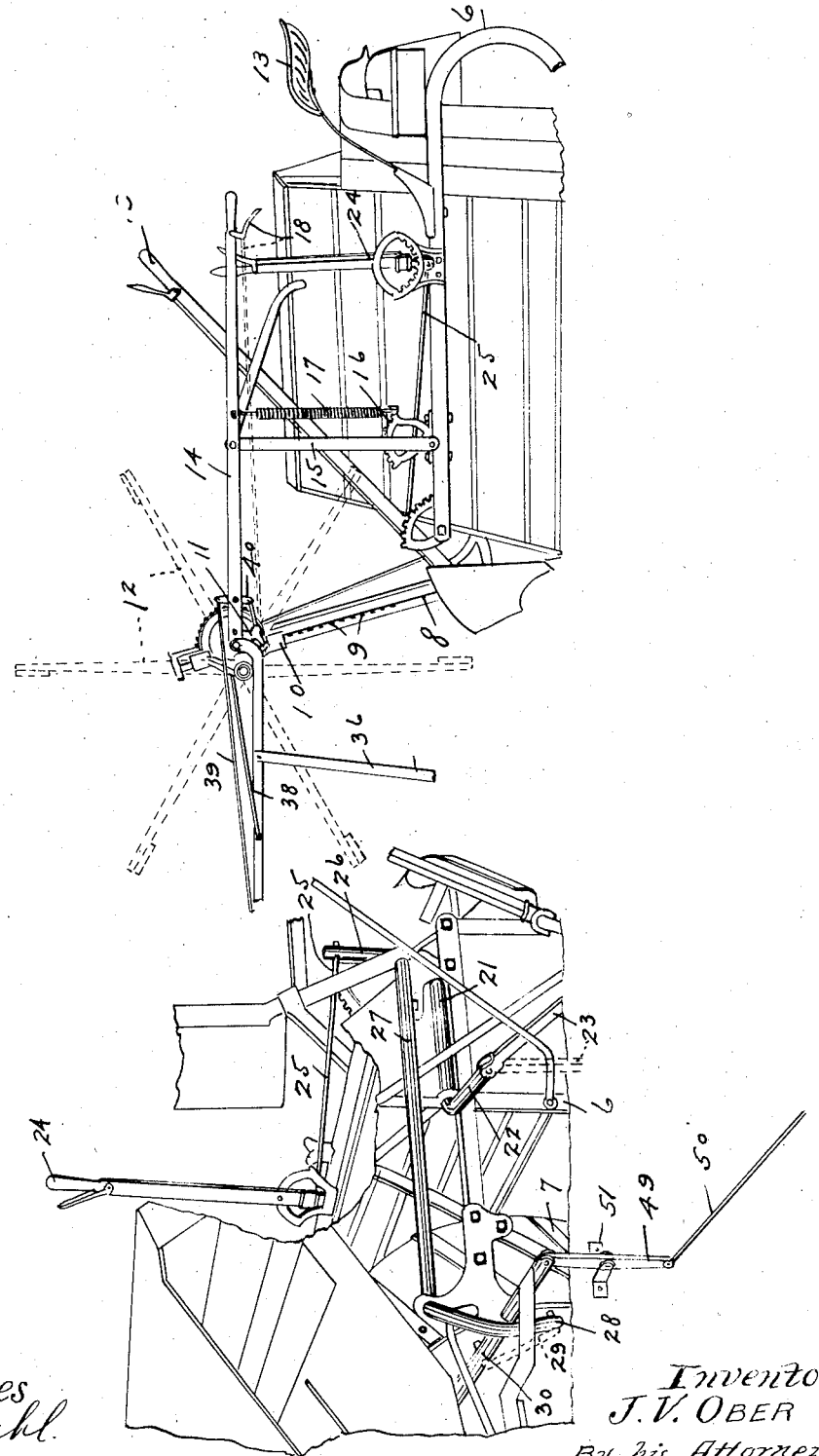

JOHN V. OBER, OF ADA, MINNESOTA.

COUPLING AND OPERATING DEVICE FOR TRACTOR-HARVESTERS.

1,339,278.  Specification of Letters Patent.  Patented May 4, 1920.

Application filed January 16, 1918. Serial No. 212,018.

*To all whom it may concern:*

Be it known that I, JOHN V. OBER, a citizen of the United States, residing at Ada, in the county of Norman and State of Minnesota, have invented certain new and useful Improvements in Coupling and Operating Devices for Tractor-Harvesters; and I do hereby declare the following to be a full, clear, and exact description of the invention, such as will enable others skilled in the art to which it appertains to make and use the same.

My invention relates to coupling and operating devices for tractor-harvesters; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a fragmentary perspective view of a tractor and a harvester diagrammatically illustrated by means of broken lines and having incorporated therein the invention; and Figs. 2 and 3 are fragmentary perspective views of the harvester, together with portions of the invention.

Of the parts of the tractor illustrated, it is only necessary to note the platform 4 and steering wheel 5 arranged to be operated from said platform. The harvester illustrated is of the well known Deering type and of the parts thereof, it is important to note the frame 6, driving wheel 7, reel standard 8 having a multiplicity of longitudinally spaced lock seats 9, reel-supporting head 10 mounted on the standard 8 for raising and lowering movement, lock pawl 11 on the head 10 for coöperation with the lock seats 9, reel 12, and seat 13 on the frame 6.

The reel 12 is raised and lowered by a horizontal lever 14 pivoted to the reel head 10 and intermediately fulcrumed on an upright 15 pivoted to the frame 6, with freedom for adjustments in the direction of the travel of the harvester and held in different set positions by a latch and lock segment 16, only the latter of which is shown. A counterbalancing spring 17 is provided for the lever 14 and anchored to the lock segment 16. The lock pawl 11 is operated by a hand piece equipped rod 18 supported from the lever 14. The harvester is tilted on a bull wheel by a latch lever 19 and other operating devices, but, for the purpose of this case, it will only be necessary to note the rock shaft 21 journaled on the frame 6 and having a crank arm 22 attached to the pole of the harvester, not shown, by a longitudinally adjustable connection 23. Of the parts for shifting the binder head, it is only necessary to note the latch lever and coöperating lock segment 24, rod 25 attached to the crank arm 26 of a rock shaft 27 journaled on the frame 6 and having at its other end a crank arm 28 connected by a link 29 to an endwise movable shaft 30. The connections for operating the bundle carrier are not shown, but will be referred to in the detailed description of the invention. It is important to note that all of the operating connections, above referred to, extend rearward and are within easy reach of an operator on the seat 13.

The parts thus far described are of standard construction and have been illustrated simply for the purpose of showing the invention applied in working position, it being understood that the invention may be incorporated in various different makes of harvesters and tractors.

Referring now in detail to the invention, the numeral 31 indicates a coupling pole, which flexibly connects the harvester to the tractor. The rear end of the pole 31 is pivoted at 32 to the harvester for vertical movement and by means of the same elements by which the customary draft pole, not shown, is attached thereto. The forward end of the coupling pole 31 is pivoted at 33 to the tractor platform 4 for horizontal swinging movement and an oblique brace rod 34 connects said forward end of the coupling pole to the frame 6. Rigidly secured to the intermediate portion of the coupling pole 31 and the brace rod 34, is a bracket 35. To this bracket 35, is pivoted an upright lever support 36, to the uppermost end of which is intermediately fulcrumed a forwardly projecting lever 37. This lever 37 performs the same function as the lever 14, towit: the raising and lowering of the reel, and is held against lateral movement by a brace rod 38 attached to the reel head 10. The lock pawl 11 is operated by a hand piece 39 pivoted to the free end of the lever 37 and to the upper end of a short vertically disposed lever 40 intermediately pivoted to the lever 14. The other end of the lever 40 is connected to the lock pawl 11 by a link 41. Obviously, by the hand piece 39 the lock pawl 11 may be released and, when released the reel 12 may be raised or lowered by the lever 37.

In removing the draft pole from the harvester, in order to substitute the coupling pole 31 therefor, the bar 23 is detached therefrom and attached to other connections for tilting the harvester, as will presently appear. To tilt the harvester, I provide a forwardly projecting latch lever 42 and a coöperating lock segment 43 carried by the coupling pole 31. On the rear end of the lever 42, is a transverse bracket 44 pivoted at 45 to the coupling pole 31, which affords the fulcrum for said lever. The upper end of the bracket 44 is rigidly connected to the intermediate portion of the latch lever 42 by truss members 46, the ends of which project rearward of the bracket 44 and are pivotally attached to the forward end of the bar 23. Obviously, the truss members 46 afford a forward extension of the bar 23 and connect the same to the lever 42. The other end of the bar 23 is attached to the harvester and, for convenience, as shown, it is pivotally secured to the crank arm of the rock shaft 21. By manipulating the lever 42 the harvester may be tilted on the bull wheel in the same manner as when the bar 23 is connected to the draft pole, as previously described. A counterbalancing spring 47 is anchored, at one end, to the coupling pole 31, between the bracket 44 and frame 6, and its other end is adjustably secured to said bracket, between the lever 42 and truss members 46.

For shifting the binder head, either the link 29 is separated from the members 28 and 30, or the latch of the lever 24 rendered inoperative, and a forwardly projecting latch lever 48 and a coöperating lock segment are provided for shifting the binder head. Said lock segment is mounted on the coupling pole 31, near the front thereof, and the lever 48 is connected to the endwise movable shaft 30 by a short lever 49 and connecting link 50. The lever 49 is intermediately fulcrumed on a bracket 51 secured to the frame 6 and its upper end is pivoted to the forwardly projecting end of the shaft 30 and the link 50 pivotally connects the lower end of the lever 49 with the intermediate portion of the lever 48.

The bundle carrier, previously referred to, but not shown, is operated by a bell crank lever 52 pivoted to a segment 53 secured to the coupling pole 31 forward of the lever 48. The short end of the lever 52 is connected to the operating mechanism of the bundle carrier by a long rod 54. Normally, the lever 52 stands in a position with the pivotal connection between its short arm and the rod 54, slightly above a dead center, and said short arm is held in this position by a stop 55 located thereabove. By reference to Fig. 1, it will be noted that all of the levers for tilting the harvester, raising and lowering the rear, shifting the binder head, and operating the bundle carrier are carried by the coupling pole 31 and are within easy reach of an operator standing on the platform 4 of the tractor and affording a duplicate set of operating devices at the front of the harvester.

The above described invention has, in actual usage, proven highly efficient for the purpose had in view.

What I claim is:—

1. The combination with a vehicle and a tractor for moving the same, of a coupling bar flexibly connecting the vehicle to the tractor, a link pivoted to the coupling bar, and a latch lever intermediately pivoted to the link and adapted to be attached to an adjusting element on the vehicle.

2. The combination with a vehicle and a tractor for moving the same, of a coupling bar flexibly connecting the vehicle to the tractor, a bracket pivoted to the coupling bar, a latch lever rigidly secured to the bracket and having a coöperating lock segment secured to the coupling bar, said latch lever being adapted to be attached to an adjusting element on the vehicle, and a counterbalancing spring attached to the bracket and coupling bar.

3. The combination with a vehicle and a tractor for moving the same, of a coupling bar flexibly connecting the vehicle to the tractor, a link pivoted to the coupling bar, a latch lever intermediately pivoted to the link and adapted to be attached to an adjusting element on the vehicle, a bracket pivoted to the coupling bar, a latch lever rigidly secured to the bracket and having a coöperating lock segment secured to the coupling bar, said last noted latch lever adapted to be attached to an adjusting element on the vehicle, and a counterbalancing spring attached to the bracket and coupling bar.

4. The combination with a vehicle and a tractor for moving the same, of a coupling bar flexibly connecting the vehicle to the tractor, a link pivoted to the coupling bar, a latch lever intermediately pivoted to the link and adapted to be attached to an adjusting element on the vehicle, a bracket pivoted to the coupling bar, a latch lever rigidly secured to the bracket and having a coöperating lock segment secured to the coupling bar, said last noted latch lever adapted to be attached to an adjusting element on the vehicle, a counterbalancing spring attached to the bracket and coupling bar, a third latch lever and coöperating lock segment on the coupling bar, and an endwise movable link pivoted to the intermediate portion of the last noted latch lever and adapted to be attached to an adjusting element on the vehicle.

5. The combination with a vehicle and a tractor for moving the same, of a coupling bar flexibly connecting the vehicle to the tractor, a link pivoted to the coupling bar, a latch lever intermediately pivoted to the link and adapted to be attached to an adjusting element on the vehicle, a bracket pivoted to the coupling bar, a latch lever rigidly secured to the bracket and having a coöperating lock segment secured to the coupling bar, said last noted latch lever being adapted to be attached to an adjusting element on the vehicle, a counterbalancing spring attached to the bracket and coupling bar, a third latch lever and coöperating lock segment on the coupling bar, an endwise movable link pivoted to the intermediate portion of the last noted latch lever and adapted to be attached to an adjusting element on the vehicle, a bell crank lever fulcrumed to the connecting bar, and having a long arm and a short arm, and a link pivoted to said short arm and adapted to be attached to an adjusting element on the vehicle.

In testimony whereof I affix my signature in presence of two witnesses.

JOHN V. OBER.

Witnesses:
CLARA DEMAREST,
HARRY D. KILGORE.